Sept. 10, 1940.                J. KIPEN                    2,214,303
                             SKID ARRESTER
                        Filed May 19, 1938        3 Sheets-Sheet 1
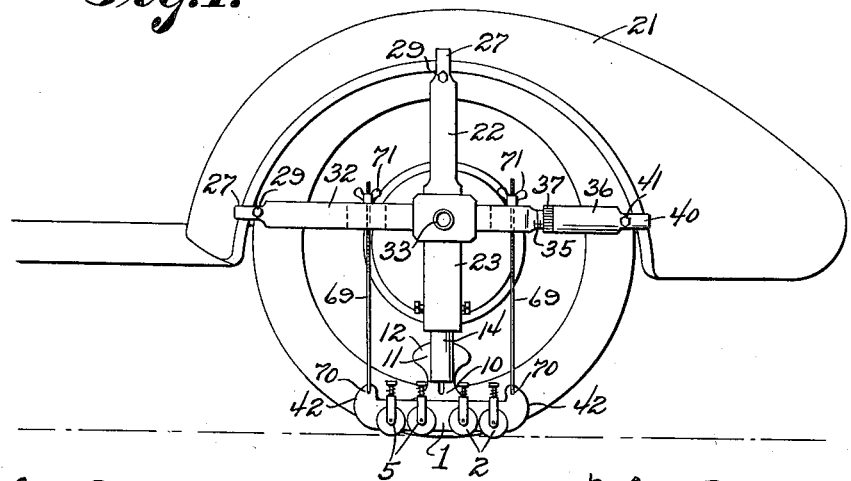
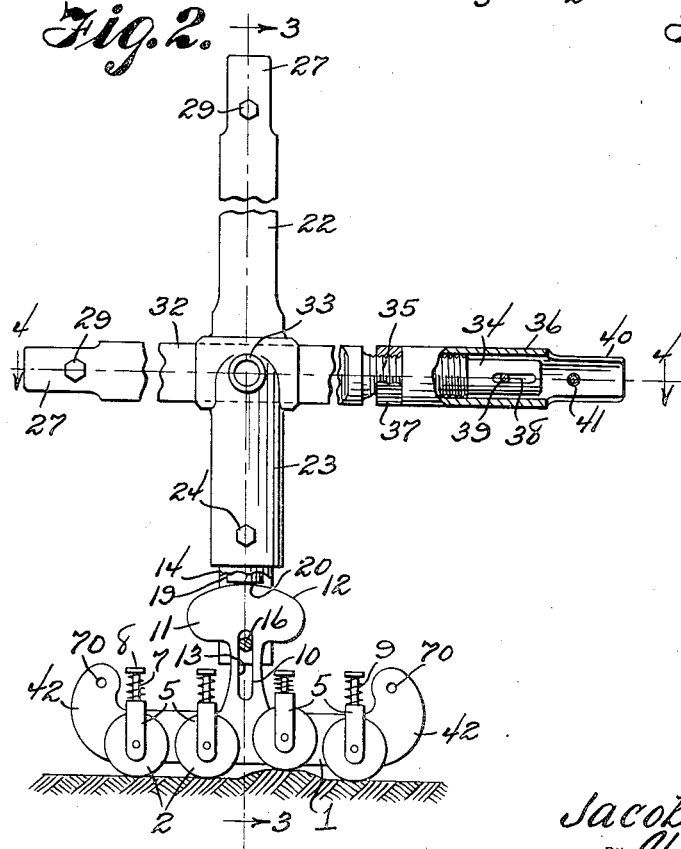
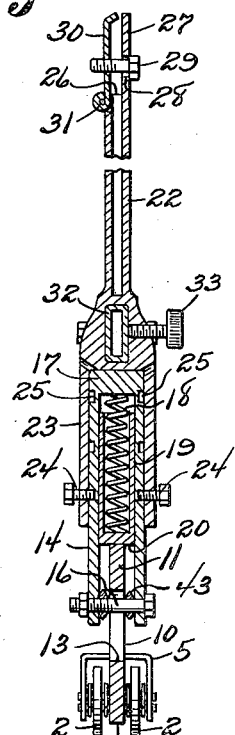
Jacob Kipen INVENTOR
BY Victor J. Evans & Co.
ATTORNEYS Sept. 10, 1940.  J. KIPEN  2,214,303
SKID ARRESTER
Filed May 19, 1938   3 Sheets-Sheet 2
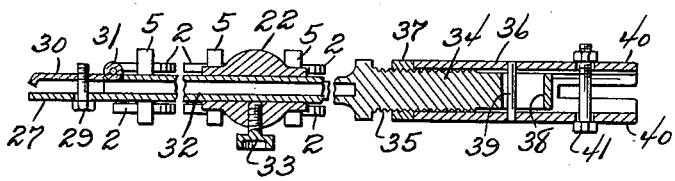
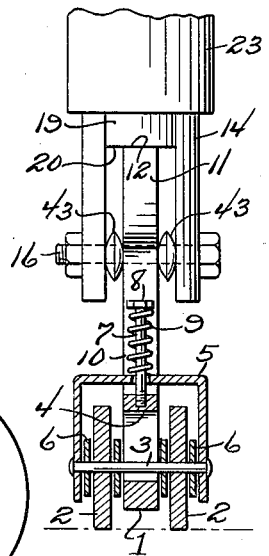
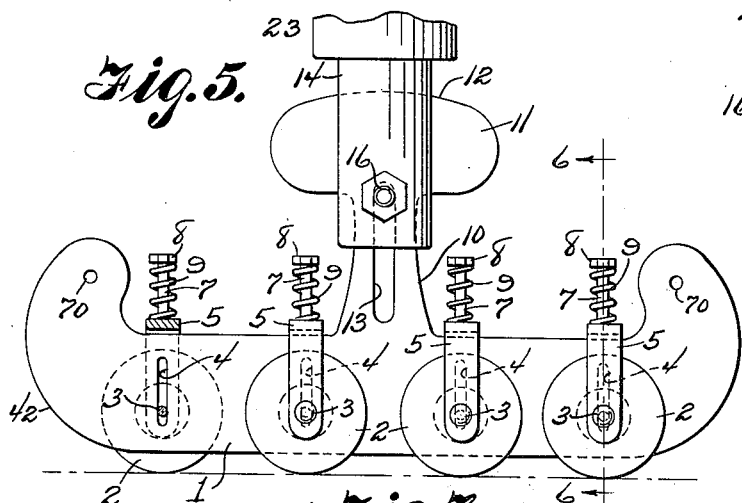
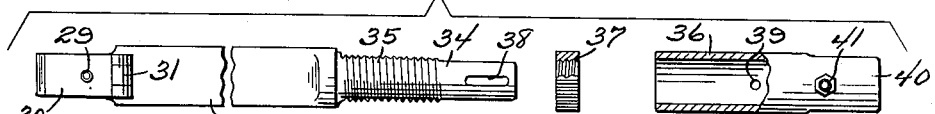
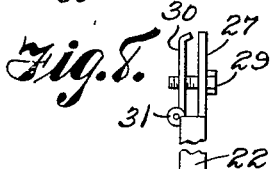
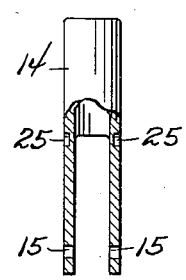
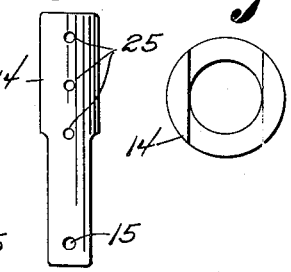
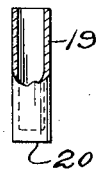
Jacob Kipen INVENTOR
BY Victor J. Evans & Co.
ATTORNEYS Sept. 10, 1940.   J. KIPEN   2,214,303
SKID ARRESTER
Filed May 19, 1938   3 Sheets-Sheet 3

Jacob Kipen INVENTOR
BY Victor J. Evans & Co.
ATTORNEYS

Patented Sept. 10, 1940

2,214,303

UNITED STATES PATENT OFFICE 2,214,303

SKID ARRESTER

Jacob Kipen, Manitowoc, Wis.

Application May 19, 1938, Serial No. 208,898

13 Claims. (Cl. 188—5)

This invention relates to skid arresters and more particularly to means for preventing the lateral sliding or skidding movement of automobiles and other vehicles on wet or icy pavements or other surfaces.

The invention has for its prime object to produce a practical and efficient unitary device mountable on an automobile or other vehicle, either permanently or as a detachable attachment, to ride on the surface of the roadway without appreciable resistance or hindrance to the movement of the vehicle in its regular line of travel, yet being effective to prevent dangerous sidewise slippage of the vehicle from its line of travel.

A particular object is to provide for ample flexibility in the structure to compensate for unevenness in the surface of the roadway without detracting from the skid arresting qualities of the device.

A further object is to produce a skid preventing device of a character whereby it may be applied on different parts of a vehicle without departing from the general principle of operation and with but slight structural changes.

With the foregoing and other objects and advantages to be attained, the invention consists in the novel general structure and in the parts and combinations and arrangements of parts thereof as hereinafter described and set forth in the appended claims, reference being had to the accompanying drawings illustrating practical adaptations of the invention, and in which Figure 1 is a side elevation showing more or less conventionally a device mounted on the rear wheel fender of an automobile;

Figure 2 is a view on an enlarged scale, partly in elevation and partly in section, of the skid preventing device shown in Figure 1 but detached from the vehicle;

Figure 3 is a vertical section on the line 3—3 of Figure 2;

Figure 4 is a horizontal section on the line 4—4 of Figure 2;

Figure 5 is a fragmentary view, on a further enlarged scale, showing more clearly the structural details of the cradle unit of the device;

Figure 6 is a section on the line 6—6 of Figure 5;

Figure 7 is a detail view illustrating cooperative parts of the horizontal supporting brace detached;

Figure 8 is a foreshortened view, partly in elevation and partly in longitudinal section, of the vertical supporting brace for the cradle unit of the device;

Figure 9 is a detail view, partly in elevation and partly in longitudinal section, of the shock absorber shell and direct support for the cradle unit;

Figure 10 is an elevation of said shell and support, the view being taken at right angles to that shown in Figure 9;

Figure 11 is an end view of said shell and support, on an enlarged scale;

Figure 12 is a detail view of the tubular follower for the shock absorbing spring;

Figure 13:
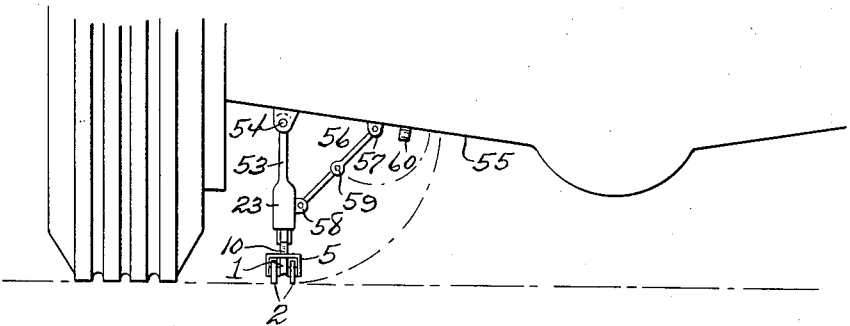
Figure 13 is a fragmentary view, showing more or less conventionally the application of a skid preventing device to the rear axle of an automobile.

Generally stated, the device of the present invention comprises a ground or road surface contacting unit, which is substantially cradle-like in action and substantially of the same structural arrangement in whatever location it is applied to the vehicle, and a shock absorbing supporting and attaching means, which latter is varied according to the place of application of the device on the vehicle.

Referring now more particularly to Figures 1 to 12, inclusive, of the drawings, the numeral 1 designates a keel or runner member which travels normally in relatively close spaced relation to the road surface, being supported on roller disks 2 which are mounted yieldably thereon, said rollers being located in series on opposite sides of the keel or runner and in cooperative pairs transversely thereof. As shown, each pair of the rollers 2 are mounted on a shaft 3 extending through a vertical slot 4 in the runner or keel 1, the shaft being mounted at its opposite ends in the leg portions of an inverted U-shape yoke 5, and spacing washers 6 being interposed between the keel or runner 1, rollers 2 and said leg portions of the yoke 5.

The middle portions of the yokes 5 are apertured to fit freely slidable on studs 7 projecting upwardly from the keel or runner 1 and having heads 8 at their upper ends, springs 9 being interposed between said heads 8 and the opposed middle portions of the yokes 5 and constantly under compression whereby to normally urge the keel or runner 1 upwardly when said rollers 2 are in contact with the road surface, or, putting it the other way around, urging the rollers downwardly with respect to the keel or runner.

The keel or runner 1 has a medial upstanding neck portion 10 terminating at its upper end with a cross head 11 whose top marginal portion 12 is curved on a radius struck from a center coinciding with the longitudinal axis of an elongated slot 13 formed in the neck portion 10.

The upper end portion of the neck 10 of the keel or runner 1 is located within the bifurcated lower end portion of a tubular direct carrier member 14 which is apertured as at 15 (see Figures 9 and 10) for the reception of a transverse supporting and guiding bolt 16 which extends through the slot 13 in said neck portion 10 of the keel or runner member 1 (see Figures 2, 3 and 5). The upper end of said tubular carrier member 14 is closed by a solid wall 17, preferably formed integrally therewith, as shown more clearly in Figure 3, and interposed between said end wall 17 and the head portion 11 on the neck 10 of said keel or runner 1 is a cooperating spring 18 and follower 19. As shown, the follower 19 is tubular and has a closed lower end portion 20 which abuts and rides directly upon the arcuate edge portion 12 of the cross head 11 so that, under the action of the spring 18, the keel or runner member 1 is constantly urged downwardly in the carrier member 14 and at the same time oscillation of said keel or runner member on the bolt 16 is permitted. By making the follower 19 tubular and elongated, as shown, substantial longitudinal bearing is afforded for the reciprocation of the member without binding in the carrier member 14 as well as for the maintenance of the spring element 18 in an ideal axial working position.

In the particular mounting of the skid arrester of the present invention on the wheel fender 21 as shown in Figure 1, a vertical supporting brace and attaching member 22 is provided. This member 22 has an enlarged tubular lower portion 23 which is preferably cylindrical and has a bore to receive the carrier member 14 snugly therein, and for fastening said member 14 in place said lower end portion 23 of the supporting brace and attaching member 22 is provided with diametrically opposite set screws 24 which are engaged in correspondingly opposed recesses 25 provided in the circumferential portion of the carrier 14, there being a longitudinal series of the recesses 25 on opposite sides of said carrier 14 whereby the carrier may be secured in different endwise adjusted positions within the portion 23.

The upper portion of the supporting brace and attaching member 22 may be of any desirable cross section, but it is preferably tubular and flattened, as shown, and provided at its extreme upper end portion with means for detachably securing it to the adjacent marginal portion of the fender 21. As shown more clearly in Figure 3, the end portion of the member 22 is cut away, as at 26, to provide a rigid flat extension 27 at one side thereof, said extension 27 being apertured, as at 28, for the reception of a clamping screw 29 whose threaded portion is fitted in a correspondingly threaded aperture provided therefor in a clamping leaf 30 which is hinged to the opposite side of said member 22, as at 31. By this provision, the member 22 is readily attached to the fender and it is removable therefrom with equal facility, and at the same time the carrier 14 for the keel or runner member 1 is as readily adjusted in the lower tubular portion 23 of said supporting brace and attaching member 22.

In order to afford a cross braced attachment of the device to the fender, the vertical member 22 is preferably provided with a transverse opening through which a horizontal brace member 32 is slidably fitted and secured in endwise adjusted position by a set screw 33. This member 32 may be of any desirable cross section, but, as shown, it is of the same rectangular tubular cross section as said member 22, and it is provided at one end with clamping elements identical with those by which the member 22 is attached to the fender 21. The opposite end portion of the cross brace member 32 is made solid and of cylindrical cross section, as at 34. This end portion 34 which is screw-threaded, as at 35, for a portion of its length is inserted telescopically within the smooth bore of a tubular extension member 36 without screw-threaded engagement therewith, a jam nut 37 being provided on the screw-threaded portion 35 so as to be tightened against the end of the tubular member 36 to lock said horizontal brace members in longitudinal adjusted position. In order to prevent independent rotation of the extension member 36 on the end portion 34 of the brace member 32 but permit relative endwise movement of said members, the end portion 34 of the member 32 is provided with a longitudinally elongated transverse slot 38 and the member 36 provided with a cross pin 39 which extends through said slot 38.

Any suitable provision may be made for detachably securing the outer end portion of the extension member 36 to the fender 21, that is to say, the means of fastening may be the same as that provided for the members 22 and 32, but, as shown, said outer end portion of the member 36 is slotted longitudinally on opposite sides to provide opposed clamping portions 40 to straddle the adjacent marginal portion of the fender 21, said portions 40 being drawn towards each other and held in their clamping relation to the fender by a cross bolt 41. Obviously, the same provision may be made for fastening the members 22 and 32 to the fender.

By the cross arrangement of the supporting and attaching brace elements, including the provision for adjusting the extension member 36 with respect to the horizontal brace member 32 and also the provision for adjusting the carrier member 14 in the lower portion of the vertical brace member, the skid arrester is readily applied to fenders of various forms and dimensions about the opening thereof in the region of the vehicle wheel so as to support the cradle unit in proper correlation to the wheel and in working relation to the road surface.

With the device of the present invention mounted as herein described, the spring element 18 holds the lower cradle unit with its roller members 2 in contact with the road surface, the respective pairs of the roller members being yieldably depressed with relation to the keel or runner member 1 by their respective spring elements 9, the combined strength of said spring elements 9 being greater than that of the spring element 18 so that the latter functions to hold the entire unit in working relation to the ground and with shock absorbing effect and at the same time the mounting of the roller members 2 on the keel or runner member 1 is such that said roller members are individually yieldable to compensate for any unevenness in the surface over which they are traveling. In addition to the vertical yieldability of the cradle unit as afforded by the spring elements 9 and 18, the entire unit is swingable about the axis of the cross bolt 16, said swinging movement being permitted by the sliding engagement of the arcuate portion 12 of the cross head 16 of the keel or runner member 1 with the end of the spring follower 19, and in this connection it is noted that the opposite end portions of the keel or runner member 1 are rounded, as at 42 so as to readily glide over an obstruction in the path thereof, said end portions being also extended upwardly some distance above the intermediate body portion of the keel or runner to further prevent it from catching with damaging effect against an obstruction. It is here further noted that the roller members 2 are preferably fitted to their respective shafts 3 with a slight degree of looseness and that there is slight play between the spacing washers 6 so that said roller members have limited transverse and wabbling movement which is of material advantage in checking the lateral skidding movement of the vehicle. So, too, the upstanding middle portion of the keel or runner 1 is permitted limited lateral swinging movement on the cross bolt 16 between the bifurcated end portions of the carrier member 14, and to facilitate this movement of the keel or runner and at the same time normally center it with relation to the opposite end portions of the member 14 rounded or bead-like washers 43 are sleeved on the cross bolt 16 between said end portions of the member 14 and the upstanding neck portion 10 of the keel or runner (see Figure 6). This limited laterally swinging movement afforded the keel or runner member 1 increases the braking effect of the cradle unit inasmuch as the corners of the tread portions of the rollers 2 and also the longitudinal corner of the keel or runner member 1 are caused to engage the surface of the roadway with biting effect.

Figure 15:
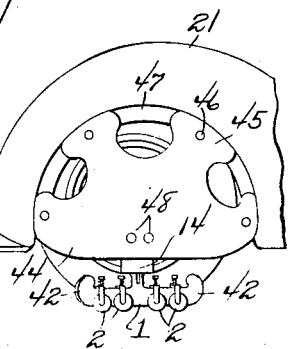
Figure 15 is a view illustrating a further modification of the invention as applied to the wheel fender of the vehicle.

Instead of mounting the device on the fender 21 by means of the vertical and horizontal supporting and attaching brace elements, as shown in Figure 1, a modified form of mounting may be provided as shown in Figure 15. In this modification the fender 21 is provided with a supplemental wheel guard or shield 44 having marginal lug portions 45 detachably secured, as at 46, to an internal arcuate flange 47 provided therefor on the fender proper. This shield 44 and its means of attachment to the fender 21 are merely illustrated conventionally in Figure 15, and in this connection it is noted that the cradle unit of the device of the present adaptation, which of itself is of the same general construction and arrangement as in the first herein described adaptation of the invention, may be mounted on the inner side of the shield 44 in any practical manner, the details of which are not herein shown and described. Suffice it to say that the carrier member 14 is conventionally indicated as attached to the shield 44, as at 48.

Figure 16:
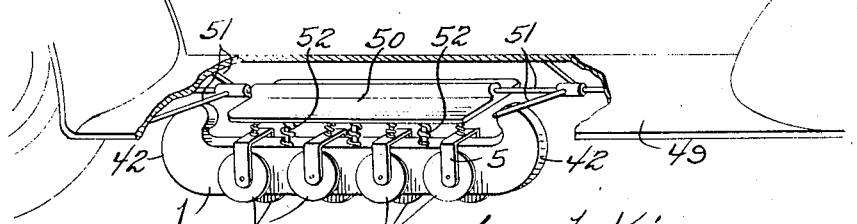
Figure 16 is a view illustrating the skid arrester as mounted beneath the running board of the vehicle.

A further modification in the adaptation of the invention is illustrated in Figure 16 wherein the skid preventing device is mounted under the running board 49 of the automobile and preferably just forward of the rear wheel in the path thereof. In this modification, as conventionally shown, the keel or runner member 1 may be suspended from a supporting plate 50 which is carried either slidably and rockably or immovably, as desired, on a suitable frame 51 secured in any suitable manner to the under side of the vehicle frame, and the keel or runner member be pressed downwardly from said supporting plate 50 by spring members 52 which may be obviously sleeved on guide studs depending from the supporting plate and providing a connection between the plate and the keel or runner member permitting vertical movement of the latter relative to the plate. The mounting of the roller members 2 on the keel or runner member 1 in this modification is the same as in the first herein described adaptation of the invention and as the particular mounting of the frame 51 and the supporting plate 50 thereon does not enter into the present invention, except as just hereinabove generally stated, no further detailed illustration or description is herein made.

A still further modification of the invention is illustrated in Figure 13 wherein the skid arrester is mounted on the under side of the rear axle of the vehicle. As shown, the supporting element 53 corresponding substantially to the first herein described element 22 is hingedly mounted, as at 54, on a bracket member depending from the under side of the axle casing 55, the lower portion of said member 53 and the attached cradle unit being identical with those parts described in connection with the disclosure in Figures 1 to 12, inclusive. The member 53 is held in its lowered working position by a diagonal brace 56, said brace being of a toggle type and pivotally attached at one end to the axle casing, as at 57, and at its opposite end to a bracket extension 58 on the lower cradle unit holding portion 23 of said member 53, by which provision the toggle brace 56 may be broken at its middle joint 59 and collapsed so that the member 53, when not in use, may be swung upwardly on its hinged support 54 and engaged with a retaining clip 60 as conventionally shown on the under side of the axle casing.

Figure 14:
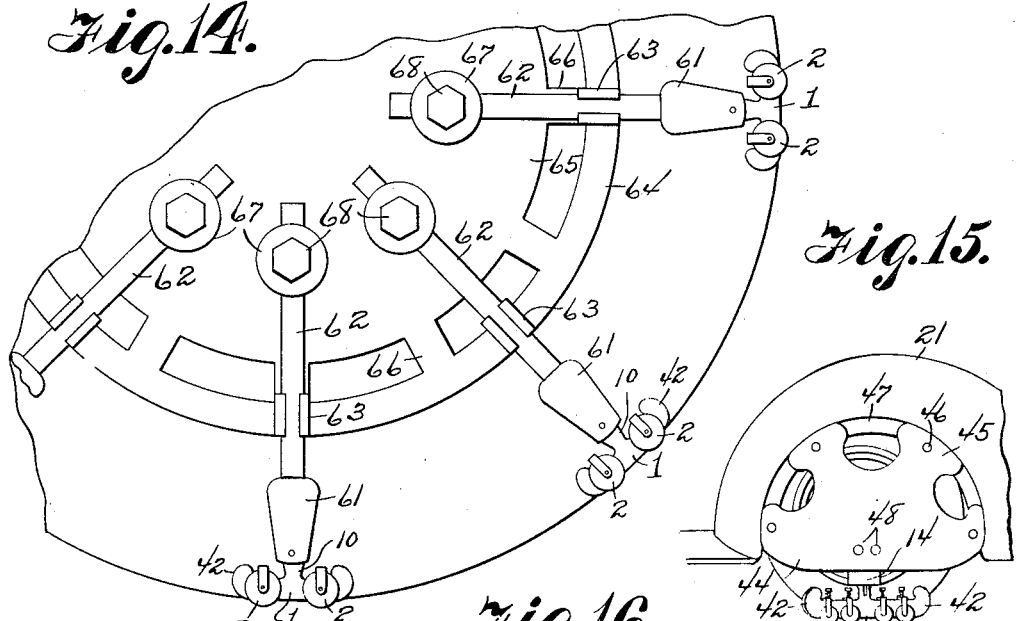
Figure 14 is a fragmentary view, more or less schematic in character, illustrating the application of the skid preventing device direct to the wheel of the vehicle.

While the device of the present invention is particularly adaptable for application to the body portions of the vehicle, as in the several modifications hereinbefore described, the skid arresting device may be applied directly to the wheel of the vehicle as indicated more or less conventionally in Figure 14. In this modification, the keel or runner member with the roller elements 2 carried thereby, is mounted in a carrier 61 which, in general respects, is substantially identical with the structural principles and arrangements as the hereinbefore described carrier 14. As shown, the carrier member 61 is provided with an elongated stem or supporting bar 62 which is fitted slidably in a conventional bracket member 63 provided on a ring member 64 which is attached to or obviously formed integrally with a central supporting plate 65 by spoke members 66. The supporting plate 65, which is secured in any desirable and practical manner to the wheel body, may be obviously cupped outwardly or otherwise formed at its central portion or else provided with an opening in that region to clear the wheel hub. As conventionally shown, the plate 65 is provided with a series of outwardly projecting lugs 67 having transverse openings therethrough in radial alignment with the respective bracket members 63 on the ring member 64 for the reception of the inner end portions of the stem extensions 62 of said carrier members 61, of which latter there is a plurality arranged in spaced relation at intervals annularly about one side portion of the tire near the tread thereof. Each of the lugs 67 is provided with a set screw 68 for fastening the respective stem members 62 in their longitudinally adjusted relation for positioning the several keel or runner members 1 and their carried roller elements 2 so as to successively come in contact with the surface of the roadway as the wheel travels thereover, it being understood that the projection of the cradle units is such that the roller members 2 are brought into intimate engaging contact with the road surface whereby to effectively prevent lateral skidding movement of the vehicle.

With the foregoing modifications illustrated conventionally in Figure 14 and the obvious adaptation of the skid arrester elements 1 and 2 and their directly associated parts to the vehicle wheel, no further illustration and detailed description thereof is deemed necessary.

While the cradle unit of the skid preventing device of the present invention may be maintained constantly in engaging relation with the surface of the roadway during the time the device is applied to the vehicle, suitable provision may be made for retracting and holding the cradle unit in a raised inactive position. For this purpose, as shown more or less conventionally in Figure 1, elongated rods 69 are pivotally attached at their lower ends to the opposite end portions of the keel or runner member 1, as at 70, said rods being extended upwardly through vertical openings provided therefor in the horizontal brace member 32. The upper end portions of the rods are screw threaded for the reception of wing nuts 71 which may be set to engage the upper side of the brace member 32 to hold the cradle unit in a raised position on the carrier member 14 and against the tension of the spring element 18, it being of course understood that the vertical openings in said brace member 32 are of considerably larger diameter than the rods 69 so as to permit relative swinging movement of the rods as well as endwise movement thereof when the cradle unit is in its lowered working position and is oscillated on its supporting pivot bolt 16 in traveling over an uneven surface. In this connection it is noted that other means may be substituted for the bars 69 and wing nuts 71 for holding the cradle unit in raised position for the particular adaptation of the invention as shown in Figure 1, and, obviously, suitable mechanical means may be provided for moving the skid arresting devices of the other modifications into and out of working position and that the general structure and arrangement of the devices themselves admit of considerable modification other than herein shown without departing from the spirit of the invention as defined in the appended claims. The invention, therefore, is not limited to the specific construction and arrangement shown in the accompanying drawings.

What is claimed is:

1. In a skid arrester for motor vehicles and the like, a cradle unit including a support, a keel member mounted on said support with vertical and pivotal movements, a spring on said support acting upon said keel member to constantly urge it downwardly on the support, a series of roller members on either side of said keel member, said roller members being arranged in cooperative pairs transversely of the keel member, and spring pressed supports on said keel member for the respective cooperative pairs of roller members, said spring pressed supports yieldably holding the roller members in engagement with the road surface and the keel member normally raised above the surface.

2. A skid preventing means for automobiles comprising a support mountable on the vehicle, a cradle unit movably mounted on said support, said unit including a longitudinal keel member having a series of stems projecting upwardly from its upper side, yoke members slidably mounted on said stems, spring elements on said stems and acting upon said yokes to urge them normally downward, roller members on said yokes riding normally on the road surface with the keel member raised from the surface, and a spring element on said support acting upon the cradle unit to constantly urge the unit downwardly.

3. A skid preventing device for automobiles and the like, comprising a support mountable on the vehicle, a longitudinal keel member having rounded end portions and a medial upstanding neck portion, said neck portion being mounted with provision for vertical and swinging movement on said support, a spring element on said support acting upon said neck portion of the keel member to constantly urge said member downwardly, a series of roller members located on either side of said keel member and arranged in cooperative pairs transversely of the member, the respective pairs of rollers being carried by spring pressed yokes supported on said keel member whereby the roller members are yieldably held in contact with the road surface and said keel member is normally raised from the surface.

4. In a skid preventing device for automobiles and the like, a support mountable on the vehicle, a longitudinal keel member carrying a series of spring pressed roller members to normally ride upon the road surface with the keel member raised above the surface, said keel member having a medial upstanding neck portion mounted on said support with provision for vertical and swinging movements, said neck portion having a cross head at its upper end formed with an arcuate top marginal portion, a follower member mounted slidably on said support and abutting the arcuate marginal portion of said cross head of the neck portion of the keel member, and a spring element on said support acting upon said follower member to constantly urge the keel member downwardly.

5. In a skid arresting device for automobiles, a cradle unit comprising a keel member carrying a series of spring pressed roller members normally riding yieldably on the road surface with the keel member raised above the surface, a support on which the keel member is mounted with provision for vertical and swinging movements, a spring element on said support constantly urging said keel member downwardly, and means for mounting the support on the vehicle, said means comprising a vertical brace member to which said support is attached, and depends downwardly therefrom, the upper end portion of said vertical brace member having provision for its attachment to the adjacent upper portion of a wheel fender, and a cross brace mounted transversely on said vertical brace member and having provision at its opposite ends for attachment to the adjacent portions of the wheel fender.

6. In a skid arrester for automobiles, a cradle unit provided and arranged to ride on the road surface in the regular direction of travel of the vehicle but acting to prevent lateral skidding movement of the vehicle, a support on which said cradle unit is mounted with provision for vertical and swinging movements, spring means on said support constantly urging said cradle unit downwardly, and means for mounting said unit on a wheel fender of the vehicle.

7. In a skid arrester for automobiles, a cradle unit provided and arranged to ride on the road surface in the regular direction of travel of the vehicle but acting to prevent lateral skidding movement of the vehicle, a support on which said cradle unit is mounted with provision for vertical and swinging movements, spring means on said support constantly urging said cradle unit downwardly, and means for mounting said unit on a wheel fender of the vehicle, said means including a vertical brace member on which said cradle unit is attached to depend therefrom, and a cross brace element on said vertical brace member, said brace members having provision at their outer ends for detachable connection with adjacent portions of the fender.

8. In a skid arrester for automobiles, a cradle unit provided and arranged to ride on the road surface in the regular direction of travel of the vehicle but acting to prevent lateral skidding movement of the vehicle, a support on which said cradle unit is mounted with provision for vertical and swinging movements, spring means on said support constantly urging said cradle unit downwardly, and means for mounting said unit on a wheel fender of the vehicle, said means including a vertical brace member on which the cradle unit is vertically adjustable, and a longitudinally extensible cross brace member adjustably mounted on said vertical brace member transversely thereof, said brace members having provision at their outer ends for detachably connecting them to the adjacent portions of the fender.

9. In a skid arrester for automobiles, in combination with a wheel fender of the vehicle, a cradle unit provided and arranged to travel on the road surface in the regular line of travel of the vehicle, but acting to prevent lateral skidding movement of the vehicle, and means for mounting a device on the wheel fender, said means including a vertical brace member on which the cradle unit is mounted with vertical adjustment, said brace member having clamping means at its upper end for detachably connecting it to the adjacent portion of the fender, a cross brace member adjustably mounted on said vertical brace member transversely thereof, said cross brace member having clamping means at its outer end for detachably connecting it to the adjacent portion of the fender, and an extension member mounted adjustably on the opposite end portion of said cross brace member and having clamping means at its outer end for detachably connecting it to the adjacent portion of the fender.

10. A skid arresting means for automobiles, including in combination with the axle casing of the vehicle, a road surface contacting unit provided and arranged to ride normally on the road surface in the direction of travel of the vehicle but acting to prevent lateral skidding movement of the vehicle, a support for said unit hingedly mounted on the axle casing, and a foldable lateral brace element for said hinged support whereby to hold said support in opened position with the contacting unit in working relation to the road surface and also whereby said support may be folded up to the under side of the axle casing.

11. A skid arresting means for automobiles, including in combination with the axle casing of the vehicle, a road surface contacting unit provided and arranged to ride normally on the road surface in the direction of travel of the vehicle but acting to prevent lateral skidding movement of the vehicle, a support for said unit hingedly mounted on the axle casing, and a foldable lateral brace element for said hinged support whereby to hold said support in opened position with the contacting unit in working relation to the road surface and also whereby said support may be folded up to the under side of the axle casing, said brace element comprising a pair of toggle members and being diagonally disposed in its set bracing position.

12. A skid preventing means for automobiles, said means comprising a road surface contacting unit including a longitudinal keel member supported beneath the running board of the vehicle and normally elevated above the road surface, and a series of roller elements yieldably mounted on said keel member and normally projected into contact with the road surface.

13. In a skid arrester for automobiles, a supporting frame mounted beneath the running board of the vehicle, a longitudinal keel member mounted on said frame to depend therefrom, interposed spring means constantly urging said keel member downwardly from the frame, a series of roller members arranged in cooperative pairs on opposite sides of said keel member, and spring pressed yokes for yieldably supporting said roller members on said keel member with normal projection below the keel member whereby to ride in contact with the road surface.

JACOB KIPEN.